(12) United States Patent
Kirchmeyer et al.

(10) Patent No.: US 8,512,812 B2
(45) Date of Patent: Aug. 20, 2013

(54) AQUEOUS DISPERSION CONTAINING A COMPLEX OF POLY(3,4-DIALKOXYTHIOPHENE) AND A POLYANION AND METHOD FOR PRODUCING THE SAME

(71) Applicants: Stephan Kirchmeyer, Leverkusen (DE); Klaus Wussow, Netphen (DE); Tetsuya Hosomi, Tatsuno (JP); Yasua Chikusa, Himeji (JP)

(72) Inventors: Stephan Kirchmeyer, Leverkusen (DE); Klaus Wussow, Netphen (DE); Tetsuya Hosomi, Tatsuno (JP); Yasua Chikusa, Himeji (JP)

(73) Assignee: Heraeus Precious Metals GmbH & Co. KG (DE)

(*) Notice: Subject to any disclaimer, the term of this patent is extended or adjusted under 35 U.S.C. 154(b) by 0 days.

(21) Appl. No.: 13/736,533

(22) Filed: Jan. 8, 2013

(65) Prior Publication Data
US 2013/0149435 A1 Jun. 13, 2013

Related U.S. Application Data

(62) Division of application No. 10/627,162, filed on Jul. 25, 2003.

(30) Foreign Application Priority Data

Jul. 26, 2002 (JP) .................................. 2002-217571

(51) Int. Cl.
*B05D 3/00* (2006.01)
*C08L 81/00* (2006.01)

(52) U.S. Cl.
USPC ......... 427/385.5; 524/811; 525/186; 525/206

(58) Field of Classification Search
USPC ............... 427/385.5; 524/811; 525/186, 206
See application file for complete search history.

(56) References Cited

U.S. PATENT DOCUMENTS

| | | | |
|---|---|---|---|
| 4,728,399 A | 3/1988 | Moehwald |
| 5,300,575 A | 4/1994 | Jonas et al. |
| 5,372,924 A | 12/1994 | Quintens et al. |
| 5,766,515 A | 6/1998 | Jonas et al. |
| 6,083,635 A | 7/2000 | Jonas et al. |
| 6,197,418 B1 | 3/2001 | Cloots et al. |
| 6,333,145 B1 | 12/2001 | Cloots et al. |
| 2006/0020092 A1 | 1/2006 | Chikusa et al. |

FOREIGN PATENT DOCUMENTS

| | | |
|---|---|---|
| EP | 440957 A2 | 8/1991 |
| EP | 686662 A2 | 12/1995 |
| EP | 1323763 A1 | 7/2003 |
| EP | 1323764 A1 | 7/2003 |
| JP | 2002060736 A | 2/2002 |
| WO | WO-03/048227 A1 | 6/2003 |

OTHER PUBLICATIONS

"Minimizing User Errors in pH Measurements—Features, Limitations & Potential Errors of the Tools of pH Measurements", Advanced Sensor Technologies, Inc., pp. 1-9, 2008.
"Improved Process Measurement & Control", Finesse LLC, pp. P01-P09, 2008.
Technical Description of pH-Meter 766, 2010.
English translation of "Versuchsbericht" ("Test Report"), pp. 1-2, 2010.

*Primary Examiner* — Vickey Nerangis
(74) *Attorney, Agent, or Firm* — Novak Druce Connolly Bove + Quigg LLP

(57) ABSTRACT

An aqueous dispersion used for producing a conductive film is provided. The dispersion contains a complex of poly(3,4-dialkoxythiophene) and a polyanion, and is produced by polymerizing 3,4-dialkoxythiophene in an aqueous solvent in the presence of the polyanion by using peroxodisulfuric acid as an oxidizing agent or by using an oxidizing agent and an acid that is employed so as to lower pH of the reaction mixture.

5 Claims, 1 Drawing Sheet

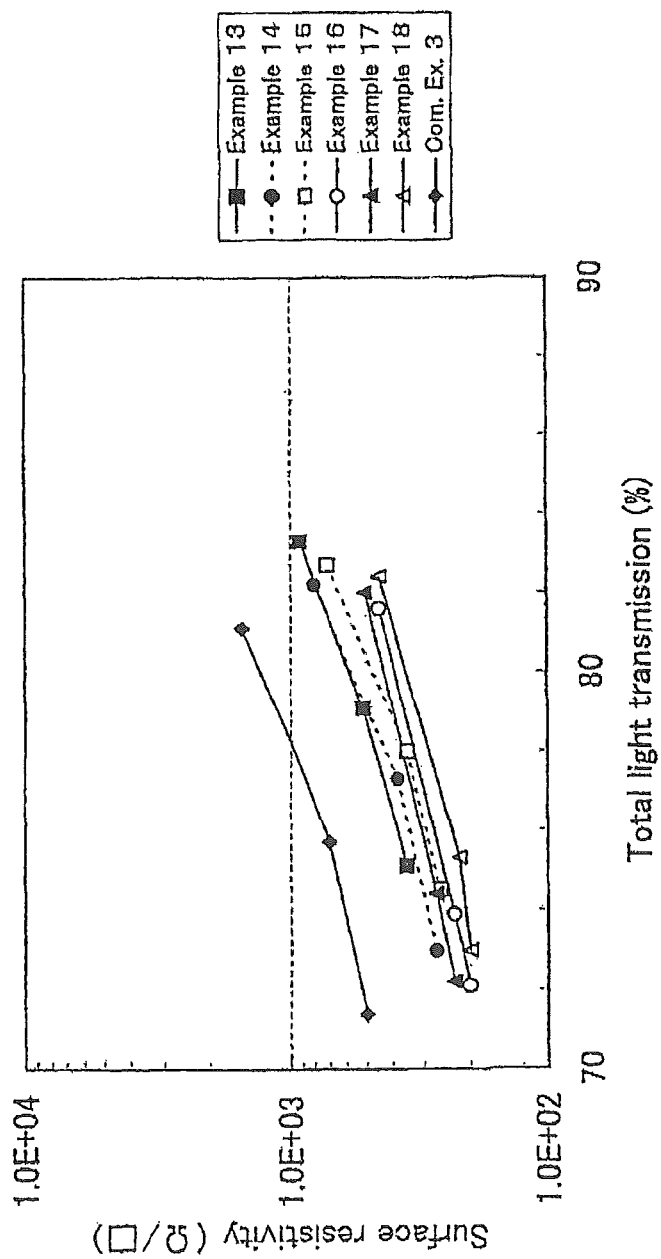

AQUEOUS DISPERSION CONTAINING A COMPLEX OF POLY(3,4-DIALKOXYTHIOPHENE) AND A POLYANION AND METHOD FOR PRODUCING THE SAME

RELATED APPLICATIONS

This application is a Division of application Ser. No. 10/627,162 filed on Jul. 25, 2003 which in incorporated by reference. Application Ser. No. 10/627,162 claims priority for Application 2002-217571 filed on Jul. 26, 2002 in Japan.

The present invention relates to an aqueous dispersion containing a complex of poly(3,4-dialkoxythiophene) and a polyanion and a method for producing the same. The present invention also relates to a coating composition containing the water dispersion and a substrate having a conductive transparent film obtained by applying the coating composition on a surface to a substrate.

Conductive transparent films are employed for coating transparent electrodes of liquid crystal displays, electroluminescence displays, plasma displays, electrochromic displays, solar cells, touch panels and the like, and for coating substrates such as those made of electromagnetic shielding material. The most widely employed conductive transparent film is a vapor deposited film made of indium-doped tin oxide (i.e., ITO). However, the formation of ITO film by a vapor deposition process has, problems such as the necessity of a high temperature for film formation and high cost for film formation. ITO film can be formed by a coating method. However, the film formation by this method requires a high temperature, the conductivity of the film depends on the degree of dispersion of ITO, and the haze value of the film is not always low. Furthermore, for an inorganic oxide film such as an ITO film, cracks tend to be generated by the bending of the substrate, so that the conductivity may be reduced.

On the other hand, a conductive transparent film made of conductive polymer that can be prepared at a low temperature and a low cost has been proposed as a conductive transparent film made of an organic material. As for the conductive polymer that can be used for such a film, Japanese Patent Publication No. JP 2636968 discloses a complex of poly(3,4-dialkoxythiophene) and a polyanion and a method for producing the complex. This complex has good water dispersibility. A thin film produced by applying a coating composition containing an aqueous dispersion of the complex to a substrate has a sufficient antistatic function, but insufficient transparency and conductivity.

Japanese Laid-Open Patent Publication No. JP 8-48858 describes that a thin film produced by applying a coating composition to a substrate has an improved conductivity, wherein the coating composition is obtained by adding a compound that is selected from the group consisting of a compound having two or more hydroxyl groups, a compound having an amide group, and a compound having a lactam group to an aqueous dispersion containing a complex of poly (3,4-dialkoxythiophene) and a polyanion described in Japanese Patent Publication No. JP 2636968. Japanese Laid-Open Patent Publication No. JP 2000-153229 describes that a thin film produced by applying a coating composition containing a non-proton compound having a dielectric constant of $\in \geqq 15$ to a substrate and drying the resultant substrate at a temperature less than 100° C. has an improved conductivity.

The properties of all the coatings compositions described in these publications are improved by adding a specific compound to the water dispersion containing a complex of poly (3,4-dialkoxythiophene) and a polyanion described in Japanese Patent Publication No. JP 2636968, and the conductivities thereof are comparatively, improved. However, the water dispersion containing the complex (i.e., a conductive polymer) is the same, so that the transparency and the conductivity of the resultant film obtained from the water dispersion are not necessarily sufficient.

The present invention is directed to solve the above-described problems, and the objective thereof is to develop an aqueous dispersion containing a conductive polymer that can be formed into a conductive thin film having excellent transparency and conductivity and a coating composition containing the water dispersion.

The inventors of the present invention found out that an aqueous dispersion containing a conductive polymer having excellent transparency and conductivity can be obtained by using peroxodisulfuric acid as an oxidizing agent or using an arbitrary oxidizing agent in combination with an acid that is used for lowering the pH in polymerizing (3,4-dialkoxythiophene) in the presence of a polyanion, as a result of in-depth research to solve the problems, and thus achieved the present invention.

The present invention provides a method for producing an aqueous dispersion containing a complex of poly(3,4-dialkoxythiophene) and a polyanion comprising: polymerizing 3,4-dialkoxythiophene represented by formula (I):

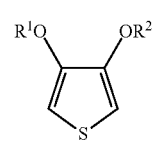

(1)

wherein $R^1$ and $R^2$ are independently hydrogen or a $C_{1-4}$-alkyl group, or together form a $C_{1-4}$-alkylene group which may optionally be substituted, wherein the polymerization is performed in the presence of the polyanion by using peroxodisulfuric acid as an oxidizing agent in an aqueous solvent.

The present invention provides a method for producing an aqueous dispersion containing a complex of poly(3,4-dialkoxythiophene) and a polyanion comprising: chemically oxidatively polymerizing 3,4-dialkoxythiophene represented by formula (1):

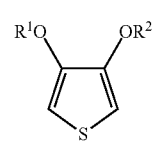

(1)

wherein $R^1$ and $R^2$ are independently hydrogen or a $C_{1-4}$-alkyl group, or together form a $C_{1-4}$-alkylene group which may optionally be substituted, wherein the polymerization is performed in the presence of the polyanion by using an oxidizing agent in an aqueous solvent, in which an acid selected from the group of water-soluble inorganic acids and water-soluble organic acids is added so as to lower pH of the resultant reaction mixture.

The present invention provides a method for producing, an aqueous dispersion containing a complex of poly(3,4-dialkoxythiophene) and a polyanion comprising: polymerizing 3,4-dialkoxythiophene represented by the formula (1):

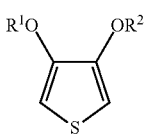

(1)

wherein $R^1$ and $R^2$ are independently hydrogen or a $C_{1-4}$-alkyl group, or together form a $C_{1-4}$-alkylene group which may optionally be substituted, wherein the polymerization is performed in the presence of the polyanion by using peroxodisulfuric acid as an oxidizing agent in an aqueous solvent, in which an acid selected from the group of water-soluble inorganic acids and water-soluble organic acids is added so as to lower pH of the resultant reaction mixture.

The present invention also provides an aqueous dispersion containing a complex of poly(3,4-dialkoxythiophene) and a polyanion obtained by the above-described method:

The present invention further provides a coating composition comprising an aqueous dispersion containing a complex of poly(3,4-dialkoxythiophene) and a polyanion; and a compound selected from the group consisting of water-soluble compounds having an amide group, water-soluble compounds having a hydroxyl group, water-soluble sulfoxides, an water-soluble sulfones.

A BRIEF DESCRIPTION OF THE FIGURES

FIG. 1 is a graph showing the relationship between the total light transmission and the surface resistivity of a coated substrate obtained by the method of the present invention.

A DETAILED DESCRIPTION OF THE INVENTION

The present invention further provides a substrate having a conductive transparent film produced by applying the above-mentioned coating composition on a surface of a substrate an drying the resultant substrate.

Hereinafter, the present invention will be described in detail.

The method for producing an aqueous dispersion containing a complex of poly(3,4-dialkoxythiophene) an a polyanion of the present invention includes polymerizing 3,4-dialkoxythiophene represented by formula (1):

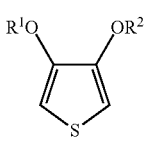

(1)

wherein $R^1$ and $R^2$ are independently hydrogen or a $C_{1-4}$-alkyl group, or together form a $C_{1-4}$-alkylene group which may optionally be substituted, wherein the polymerization is performed in the presence of the polyanion by using peroxodisulfuric acid as an oxidizing agent in an aqueous solvent, or using an oxidizing agent in an aqueous solvent, in which an acid selected from the group of water soluble inorganic acids and water-soluble organic acids is added so as to lower pH of the resultant reaction mixture.

In 3,4-dialkoxythiophene, preferable examples of the $C_{1-4}$-alkyl groups represented by $R^1$ and $R^2$ include a methyl group, an ethyl group, and an n-propyl group. Examples of the $C_{1-4}$-alkylene group formed by $R^1$ and $R^2$ together include a 1,2-alkylene group and a 1,3-alkylene group, preferably a methylene group, a 1,2-ethylene group, and a 1,3-propylene group. Among these, the 1,2-ethylene group is particularly preferable. The $C_{1-4}$-alkylene group may optionally be substituted, and examples of the substitute include a $C_{1-12}$-alkyl group and a phenyl group. Examples of a substituted $C_{1-4}$-alkylene group include a 1,2-cyclohexylene group and a 2,3-butylene group. The 1,2-alkylene group that can be formed by $R^1$ and $R^2$ together an that may be substituted with a $C_{1-12}$-alkyl group is a typical example of the alkylene groups. This 1,2-alkylene group can be derived from 1,2-dibromoalkanes that can be obtained by bromination of an α-olefin such as ethene, propene, hexene, octene, dodecene, or styrene.

Examples of the polyanion used in the above-described method include a polycarboxylic acid such as polyacrylic acid, polymethacrylic acid and polymaleic acid, and a polysulfonic acid such as polystyrene sulfonic acid, and polyvinyl sulfonic acid. Among these, polystyrene sulfonic acid is particularly preferable. The polycarboxylic acid may be a copolymer of vinyl carboxylic acid and another polymerizable monomer, and the polysulfonic acids may be a copolymer of vinyl sulfonic acid and another polymerizable monomer. Examples of the polymerizable monomer include acrylates and styrene. The number average molecular weight of the polyanion is preferably in the range from 1 000 to 2 000 000, more preferably 2 000 to 500 000, and most preferably 10 000 to 200 000. The amount of the polyanion used is preferably 50 to 3 000 parts by weight, more preferably 100 to 1 000 parts by weight, and most preferably 150 to 500 parts by weight with respect to 100 parts by weight of the thiophene.

The solvent used in the above-described method is an aqueous solvent, an water is particularly preferable. Alternatively, water containing a water-miscible solvent such as alcohols, (e.g., methanol, ethanol, 2-propanol and 1-propanol), acetone, and acetonitrile can be used.

In the method of the present invention, examples of the oxidizing agent used in a polymerization reaction of 3,4-dialkoxythiophene include, but are not limited to, peroxodisulfuric acid, sodium peroxodisulfate, potassium peroxodisulfate, ammonium peroxodisulfate, inorganic salts of ferric oxide, such as iron(III) salts of inorganic acids, organic salts of ferric oxide, such as iron(III) salts of organic acids, hydrogen peroxide, potassium permanganate, potassium dichromate, perboric acid alkaline salts, and copper salts. Among these, peroxodisulfuric acid, sodium peroxodisulfate, potassium peroxodisulfate and ammonium peroxodisulfate are most preferable. The amount of the oxidizing agent used is preferably 1 to 5 equivalents, and more preferably 2 to 4 equivalents, with respect to one mole of the thiophene.

In the method of the present invention, it is preferable that the pH of the reaction mixture during polymerization is low (preferably 1.5 or less). For this reason, when peroxodisulfuric acid is selected from the above-listed oxidizing agents, simply adding it to the reaction system without adjusting the pH is sufficient for preferable use. When other oxidizing agents are selected, it is necessary to add an acid to adjust the pH. The pH of the reaction mixture is preferably 1.5 or less, and more preferably 1.0 or less.

As the acid, an acid selected from the group of water-soluble inorganic acids and water-soluble organic acids can be used. Examples of inorganic acids include hydrochloric acid, sulfuric acid, nitric acid and phosphoric acid. Examples of the organic acids include p-toluenesulfonic acid, benzenesulfonic acid, methanesulfonic acid, and trifluoromethanesulfonic acid.

Furthermore, as the oxidizing agent, a catalytic amount of metal ions, such as iron, cobalt, nickel, molybdenum, and vanadium ions (compounds that can form such metal ions) can be added, if necessary.

The temperature of the reaction mixture during polymerization in the method is 0 to 100° C., preferably 0 to 50° C., and more preferably 0 to 30° C. for suppression of side reactions.

The polymerization reaction can be performed for 5 to 100 hours, depending on the type and the amount of the oxidizing agent, the polymerization temperature, the pH of the reaction mixture and the like. In general, the time is 10 to 40 hours.

The polymerization reaction produces poly(3,4-dialkoxythiophene). This polymerisation is conducted in presence of a polyanion and the poly(3,4-dialkoxythiophene), consequently, is complexed with this polyanion, so that it is referred to as "a complex of poly(3,4-dialkoxythiophene) and a polyanion" or simply "a complex" in this specification.

The coating composition of the present invention can contain a compound selected from the group of a water-soluble compound having an amide group, a water-soluble compound having a hydroxyl group, a water-soluble sulfoxide, and a water-soluble sulfone, in addition to the water dispersion containing the complex of poly(3,4-dialkoxythiophene) and a polyanion. The compound(s) is/are contained in order to improve the conductivity of the coated film.

Examples of the water-soluble compound having an amide group contained in the coating composition of the present invention include, but are not limited to, N-methyl-2-pyrrolidone, 2-pyrrolidone, N-vinyl-2-pyrrolidone, N-methylformamide, N,N-dimethylformamide, and formamide. Lactones such as γ-butyrolactone have substantially the same effects as those of the water-soluble compound having an amide group. Among these, N-methyl-2-pyrrolidone, 2-pyrrolidone, N-vinyl-2-pyrrolidone, N-methylformamide, formamide and N,N-dimethylformamide are preferable. The most preferable compound is N-methylformamide. These amide compounds can be used alone or in combination of two or more.

Preferable examples of the water-soluble compound having a hydroxyl group contained in the coating composition of the present invention include polyhydric-alcohols such as glycerol, 1,3-butanediol, ethylene glycol, and diethylene glycol monoethylether. They can be used alone or in combination of two or more.

Examples of the water-soluble sulfoxide contained in the coating composition of the present invention include dimethyl sulfoxide and diethyl sulfoxide.

Examples of the water-soluble sulfone contained in the coating composition of the present invention include diethyl sulfone and tetramethylene sulfone.

For the purpose of improving the film-forming properties and the adhesiveness with the substrate, the coating composition of the present invention may contain a water-soluble or water-dispersible binder resin. Examples of the water-soluble or water-dispersible binder resin include, but are not limited to, polyesters, poly(meth)acrylates, polyurethanes, polyvinyl acetate, polyvinylidene chloride, polyamides, polyimides, copolymers having a copolymer component selected from styrene, vinylidene chloride, vinyl chloride, and an alkyl (meth)acrylate.

For the purpose of improving the wettability with the substrate, the coating composition of the present invention may contain a small amount of a surfactant. Preferable examples of the surfactant include, but are not limited to, nonionic surfactants (e.g., polyoxyethylene alkyl phenyl ethers, polyoxyethylene alkyl ethers, sorbitan fatty acid esters, an fatty acid alkylol amides), and fluorocarbon surfactants (e.g., fluoroalkyl carboxylic acids, perfluoroalkyl benzene sulfonic acids, perfluoroalkyl quarternary ammonium salts, and perfluoroalkyl polyoxyethylene ethanol).

Furthermore, for the purpose of improving the wettability with the substrate and the drying properties of the coated: film, the coating composition of the present invention may contain water or a water-miscible solvent. Examples of the water-miscible solvent include, but are not limited to, methanol, ethanol, 2-propanol, n-propyl alcohol, isobutanol, ethylene glycol, propylene glycol, acetone, methyl ethyl ketone, acetonitrile, tetrahydrofuran, dioxane, and a mixed solvent of these substances.

Examples of the substrate that is coated with the coating composition of the present invention include a plastic sheet, a plastic film, nonwoven fabric, and a glass plate. Examples of plastics that form the plastic sheet or film include polyesters, polystyrene, polyimides, polyamides, polysulfones, polycarbonates, polyvinyl chloride, polyethylene, polypropylene, a blend of these polymers, a copolymer containing a monomer constituting these polymers, a phenol resin, an epoxy resin, and ABS resin.

Examples of an appropriate coating process include, but are not limited to, coating techniques such as gravure coating, roll coating, and bar coating; printing techniques such as screen printing, gravure printing, flexography, offset printing, and ink jet printing; spray coating; and dip coating.

A film (i.e.; a conductive transparent film) is formed on a surface of a substrate by applying to coating composition to the substrate and drying the substrate. The coated liquid is dried at 20 to 250° C. for 3 seconds to one week, preferably at 70 to 130° C. for 5 seconds to 60 seconds.

Thus, a coated substrate having the conductive transparent film of the present invention can be obtained. The obtained thin film on the surface of the substrate has flexibility and remarkably improved transparency and conductivity, compared with a conventional thin film made of a polythiophene conductive polymer.

The conductive transparent film can be used preferably in surface electrodes of an electroluminescence panel, pixel electrodes of liquid crystal displays, electrodes of capacitors, various transparent electrodes such as transparent electrodes of a touch panel, and electromagnetic shielding of cathode-ray tube displays.

FIG. 1 is a graph showing the relationship between the total light transmission and the surface resistivity of a coated substrate obtained by the method of the present invention.

EXAMPLES

Hereinafter, the present invention will be described more specifically by way of examples and comparative examples. However, the present invention is not limited to the examples. It should be noted that the term "parts" in the following examples and comparative examples refers to "Parts by weight".

1. Material Used

In the examples and the comparative examples, VERSA-TL 72 (number average molecular weight: 75 000, solid content: 20%) manufactured by Nippon NSC Ltd. was diluted, and used as an aqueous solution of polystyrene sulfonic acid for producing an aqueous dispersion containing a complex of poly(3,4-dialkoxythiophene) and a polyanion.

For an ion exchange treatment of the water dispersion of poly(3,4-dialkoxythiophene) and a polyanion, Lewatit S100H manufactured by BAYER AG was used as a cation exchange resin, and Lewatit MP62 by BAYER AG was used as an anion exchange resin.

As a polyester resin water dispersion serving as a binder component of the coating composition in the examples and the comparative examples, Gabsen ES-210 (solid content: 25%) manufactured by Nagase Chemtex Corporation was used. As the fluorocarbon surfactant, Pluscoat RY-2 (solid content: 10%) manufactured by Goo Chemical Co., Ltd. was used.

2. Coating and Drying Process

The coating composition was coated on a substrate and dried in the following manner in the examples and the comparative examples. As the Substrate; a PET: film (Lumirror T-60 manufactured by Toray Inc.) was used, and the Coating composition was applied with a wire bar [No. 8 (for preparing a layer having a thickness of 18.3 μm in a wet condition), No. 12 (for preparing a layer having a thickness of 27.4 μm in a wet condition, or No. 16 (for preparing a layer having a thickness of 36.6 μm in a wet condition)], and dried by blowing at 100° C. for 1 to 3 minutes, and thus a coated substrate having a thin film was obtained.

3. Evaluation of the Thin Film on the Surface of the Substrate in the Examples and the Comparative Examples 3.1 The surface resistivity was measured with Loresta-GP (MCP-T600) manufactured by Mitsubishi Chemical Corporation according to JIS K 6911.

3.2 The total light transmission and the haze value were measured with a haze computer HGM-2B manufactured SUGA Test Instruments Co. Ltd. according to JIS K7150. The total light transmission of an untreated PET film (Lumirror T type: Toray) is 87.8%, and the haze value is 1.9%.

3.3 The adhesion of the'coated film to the substrate was measured according to the lattice pattern cutting test of JIS $K_{5400}$.

Example 1

First, 49 parts of a 1% iron (III) sulfate aqueous solution, 8.8 parts of 3,4-ethylenedioxythiophene and 117 parts of a 10.9% peroxodisulfuric acid aqueous solution were added to 1887 parts of an aqueous solution containing 20.8 parts of polystyrene sulfonic acid. The pH of the reaction mixture at this time was 1.34. This reaction mixture was stirred at 18° C. for 23 hours. Then, 154 parts of cation exchange resin and 232 parts of anion exchange resin were added to the reaction mixture and stirred for 2 hours. Thereafter, the ion exchange resin was filtered off so that a deionized water dispersion (2041 parts: solid content of 1.32%) containing a complex of poly(3,4-ethylenedioxythiophene) and a polystyrene sulfonic acid was obtained.

Comparative Example 1

First, 49 parts of a 1% iron (III) sulfate aqueous solution, 8.8 parts of 3,4-ethylenedioxythiophene and 17.4 parts of sodium peroxodisulfate were added to 2012 parts of an aqueous solution containing 22.2 parts of polystyrene sulfonic acid. The pH of the reaction mixture at this time was 1.52. This reaction mixture was stirred at 18° C. for 23 hours. Then, 15.4 parts of cation exchange resin and 232 parts of anion exchange resin were added to the reaction mixture and stirred for 2 hours. Thereafter, the ion exchange resin was filtered off so that a deionized water dispersion (2066 parts: solid content of 1.37%) containing a complex of poly(3,4-ethylenedioxythiophene) and a polystyrene sulfonic acid was obtained.

Example 2

First, 49 parts of a 1% A iron (III) sulfate aqueous solution, 64.2 parts of a 25% sulfuric acid aqueous solution, 8.8 parts of 3,4-ethylenedioxythiophene and 17.4 parts of sodium peroxodisulfate were added to 1964 parts of an aqueous solution containing 22.2 parts of polystyrene sulfonic acid. The pH of the reaction mixture at this time was 0.93. This reaction mixture was stirred at 18° C. for 23 hours, Then, 154 parts of cation exchange resin and 232 parts of anion exchange resin were added to the reaction mixture and stirred for 2 hours. Thereafter, the ion exchange resin was filtered off so that a deionized water dispersion (2082 parts: solid content of 1.35%) containing a complex of poly(3,4-ethylenedioxythiophene) and a polystyrene sulfonic acid was obtained.

Example 3

First, 49 parts of a 1% iron (III) sulfate aqueous solution, 64.2 parts of a 25% sulfuric acid aqueous solution, 8:8 parts of 3,4-ethylenedioxythiophene and 120.7 parts of a 10.9% peroxodisulfuric acid aqueous solution were added to 1859 parts of an aqueous solution containing 22.2 parts of polystyrene sulfonic acid. The pH of the reaction mixture at this time was 0.93. This reaction mixture was stirred at 18° C. for 23 hours. Then, 154 parts of cation exchange resin and 232 parts of anion exchange resin were added to the reaction mixture and stirred for 2 hours. Thereafter, the ion exchange resin was filtered off so that a deionized water dispersion (2081 parts: solid content of 1.35%) containing a complex of poly(3,4-ethylenedioxythiophene) and a polystyrene sulfonic acid was obtained.

Example 4

First, 49 parts of a 1% iron (III) sulfate aqueous solution, 30 parts of a concentrated nitric acid solution, 8.8 parts of 3,4-ethylenedioxythiophene and 121 parts of a 10.9% peroxodisulfuric acid aqueous solution were added to 1887 parts of an aqueous solution containing 22.2 parts of polystyrene sulfonic acid. The pH of the reaction mixture at this time was 0.83. This reaction mixture was stirred at 18° C. for 19 hours. Then, 154 parts of cation exchange resin and 232 parts of anion exchange resin were added to the reaction mixture and stirred for 2 hours. Thereafter, the ion exchange resin was filtered off so that a deionized water dispersion (2075 parts: solid content of 1.36%) containing a complex of poly(3,4-ethylenedioxythiophene) and a polystyrene sulfonic acid was obtained.

Example 5

First, 49 parts of a 1% iron (III) sulfate aqueous solution, 25 parts of trifluoromethane sulfuric acid, 8.8 parts of 3,4-ethylenedioxythiophene and 121 parts of a 10.9% peroxodisulfuric acid aqueous solution were added to 1850 parts of an aqueous solution containing 22.2 parts of polystyrene sulfonic acid. The pH of the reaction mixture at this time was 1.22: This reaction mixture was stirred at 18° C. for 23 hours. Then, 154 parts of cation exchange resin and 232 parts of anion exchange resin were added to the reaction mixture and stirred for 2 hours. Thereafter, the ion exchange resin was filtered off so that a deionized water dispersion (2033 parts: solid content of 1.39%) containing a complex of poly(3,4-ethylenedioxythiophene) and a polystyrenesulfonic acid was obtained.

Example 6

First, 49 parts of a 1% iron (III) sulfate aqueous solution, 20 parts of a concentrated hydrochloric acid solution, 8.8 parts of 3,4-ethylenedioxythiophene and 117 parts of a 10.9% peroxodisulfuric acid aqueous solution were added to 1887 parts of an aqueous solution containing 22.2 parts of polystyrene sulfonic acid. The pH of the reaction mixture at this time was 0.95. This reaction mixture was stirred at 18° C. for 23 hours. Then, 154 parts of cation exchange resin and 232 parts of anion exchange resin were added to the reaction mixture and stirred for 2 hours. Thereafter, the ion exchange resin was filtered off so that a deionized water dispersion (2061 parts: solid content of 1.37%) containing a complex of poly(3,4-ethylenedioxythiophene) and a polystyrene sulfonic acid was obtained.

Example 7

First, 5 parts of a polyester resin water dispersion, 4 parts of N-methylformamide and 1 part of a fluorocarbon surfactant were added to 90 Parts of the water dispersion containing a complex of poly(3,4-ethylenedioxythiophene) and a polystyrene sulfonic acid obtained in Example 1, and the mixture was stirred for one hour, so that 100 parts of a coating composition was obtained.

Examples 8 to 12

The same operation as in Example 7 was performed except that the water dispersion obtained in Example 1 was replaced by each of the water dispersions obtained in Examples 2 to 6, so that 100 parts of a coating composition were correspondingly obtained.

Comparative Example 2

The same operation as in Example 7 was performed except that the water dispersion obtained in Example 1 was replaced by the water dispersion obtained in Comparative Example 1, so that 100 parts of a coating composition were obtained.

Example 13

The coating composition obtained in Example 7 was coated onto a surface of a PET film with each of the three types of wire bars, and then dried, so that a substrate coated with a thin film was obtained. Table 1 shows the evaluation results of the total light transmission and the haze value of the obtained coated substrate and the surface resistivity and the adhesion of the thin film on the substrate. The total light transmission and the haze value of the PET film used as the substrate were 87.8% and 1.9%.

Examples 14 to 18

The same operation as in Example 13 was performed except that the coating composition obtained in Example 7 was replaced by each of the coating compositions obtained in Examples 8 to 12. Table 1 collectively shows the evaluation results of the obtained thin films on the surfaces of the substrates.

Comparative Examples 3

The same operation as in Example 13 was performed except that the coating composition obtained in Example 7 was replaced by each of the coating compositions obtained in Comparative Examples 2. Table 1 collectively shows the evaluation results of the obtained thin films on the surfaces of the substrates.

TABLE 1

| | Wire bar | Thin film thickness after drying (μm) | Total light transmission (%) | Surface resistivity (Ω/□) | Haze value (%) | Adhesion (points) |
|---|---|---|---|---|---|---|
| Example 13 | No. 8 | 0.33 | 83.3 | 9.2E+02 | 2.1 | 10 |
| | No. 12 | 0.49 | 79.1 | 5.2E+02 | 2.3 | 10 |
| | No. 16 | 0.66 | 75.1 | 3.5E+02 | 2.7 | 10 |
| Example 14 | No. 8 | 0.33 | 82.2 | 8.0E+02 | 2.3 | 10 |
| | No. 12 | 0.49 | 77.3 | 3.8E+02 | 2.5 | 10 |
| | No. 16 | 0.66 | 73.0 | 2.7E+02 | 2.6 | 10 |
| Example 15 | No. 8 | 0.33 | 82.7 | 7.1E+02 | 2.3 | 10 |
| | No. 12 | 0.49 | 78.0 | 3.5E+02 | 2.4 | 10 |
| | No. 16 | 0.66 | 74.5 | 2.6E+02 | 2.6 | 10 |
| Example 16 | No. 8 | 0.33 | 81.6 | 4.5E+02 | 3.1 | 10 |
| | No. 12 | 0.49 | 73.9 | 2.3E+02 | 3.7 | 10 |
| | No. 16 | 0.66 | 72.1 | 2.0E+02 | 3.9 | 10 |
| Example 17 | No. 8 | 0.33 | 82.0 | 5.1E+02 | 2.8 | 10 |
| | No: 12 | 0.49 | 74.4 | 2.7E+02 | 3.5 | 10 |
| | No. 16 | 0.66 | 72.2 | 2.3E+02 | 3.7 | 10 |
| Example 18 | No. 8 | 0.33 | 82.4 | 4.5E+02 | 2.7 | 10 |
| | No. 12 | 0.49 | 75.3 | 2.2E+02 | 3.2 | 10 |
| | No. 16 | 0.66 | 73.0 | 2.0E+02 | 3.3 | 10 |
| Com. Ex. 3 | No. 8 | 0.33 | 81.1 | 1.5E+03 | 2.8 | 10 |
| | No. 12 | 0.49 | 75.7 | 7.0E+02 | 2.2 | 10 |
| | No. 16 | 0.66 | 71.4 | 5.0E+02 | 2.5 | 10 |

As seen from Table 1, all the examples exhibit higher total light transmissions and lower surface resistivities than those of the comparative example. The haze value and the adhesion in the examples and those in the comparative examples are substantially equal to each other. Furthermore, the substrates coated with the thin ulnas obtained in Examples 13 to 18 and Comparative Example 3 were bent 50 times each in the opposite directions so that the radius of the concave portion of each of the bent films was 1 cm, and the surface resistivity before and after the bending was measured. The surface resistivity was not substantially changed (within ±5%) in all the cases, which indicates that they were flexible. FIG. 1 shows the relationship between the total light transmission and the surface resistivity of the coated substrate shown in Table 1. The surface resistivity at a total light transmission of 80% was read, and Table 2 shows the results collectively.

TABLE 2

| | Water dispersion of complex | Oxidizing agent | Acid | Surface resistivity at total light transmission of 80% (Ω/□) |
|---|---|---|---|---|
| Example 13 | Example 1 | Peroxodisulfuric acid | — | 600 |
| Example 14 | Example 2 | Sodium peroxodisulfate | Sulfuric acid | 560 |
| Example 15 | Example 3 | Peroxodisulfuric acid | Sulfuric acid | 470 |
| Example 16 | Example 4 | Peroxodisulfuric acid | conc. Nitric acid | 390 |
| Example 17 | Example 5 | Peroxodisulfuric acid | Trifluoromethan sulfonic acid | 420 |
| Example 18 | Example 6 | Peroxodisulfuric acid | conc. Hydrochloric acid | 350 |
| Com. Ex. 3 | Com. Ex. 1 | Sodium peroxodisulfate | — | 1300 |

As seen from Table 2, in Example 13 where the composition (Example 7) containing the water dispersion (Example 1) produced by using peroxodisulfuric acid as an oxidizing agent was applied, the surface resistivity (600Ω/□) at a total light transmission of 80% was more than 50% lower than that of Comparative Example 3 where sodium peroxosulfate was used.

Also in the case (Example 14) where a composition (obtained in Example 8) containing the water dispersion (obtained in Example 2; this dispersion corresponds to a dispersion that is obtained by adding sulfuric acid to the reaction mixture of Comparative Example 1 to adjust the pH to be 0.93) was applied, the surface resistivity at a total light transmission of 80% was reduced from 1300Ω/□ (Comparative Example 3 that employs the dispersion of Comparative Example 1) to 560Ω/□.

Furthermore, the surface resistivity at a total light transmission of 80% was reduced further by using peroxodisulfuric acid as the oxidizing agent, and further adding an organic acid or an inorganic acid to lower the pH in the same manner as in Examples 3 to 6 (see Examples 15 to 18).

Thus, a coated substrate having good transparency and conductivity can be obtained by using peroxodisulfuric acid as an oxidizing agent or using an arbitrary oxidizing agent in combination with an acid that is used for lowering the pH.

The coating composition containing an aqueous dispersion comprising a complex of poly(3,4-dialkoxythiophene) and a polyanion of the present invention can be easily formed into a film by a wet process, and this film has flexibility and excellent transparency and conductivity. Therefore, the coating composition of the present invention is useful for producing surface electrodes of electroluminescence panels, pixel electrodes of liquid crystal displays, electrodes of capacitors, various transparent electrodes such as transparent electrodes of touch panels, and electromagnetic shielding of cathode-ray tube displays. Furthermore, the composition can be formed into a film at a low temperature, and the film has flexibility, so that the film is particularly useful as a conductive transparent film formed on a plastic film substrate.

The invention claimed is:

1. A method of preparing a coated substrate having a conductive transparent film comprising the steps:
   I) polymerizing a 3,4-alkylenedioxythiophene represented by formula (I):

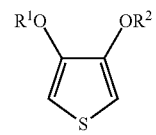

wherein $R^1$ and $R^2$ together form a $C_{1-4}$-alkylene group which is optionally substituted, wherein the polymerization is performed in the presence of the polyanion by using peroxodisulfuric acid as an oxidizing agent in an aqueous solvent and wherein the pH during polymerization is 1.5 or less and wherein said aqueous solvent is water and said polyanion is a polystyrene sulfonic acid, thereby obtaining aqueous dispersion containing a complex of a poly(3,4-alkylenedioxythiophene) and a polyanion, wherein a dried film of the dispersion with a film thickness of 0.33 μm has a surface resistivity of 150 ohm/square to 920 ohm/square;
   II) applying a coating composition comprising the aqueous dispersion and a compound selected from the group consisting of water-soluble compounds having an amide group, water-soluble compounds having a hydroxyl group, water-soluble sulfoxides, and water-soluble sulfone on the surface of the substrate and drying the resultant surface.

2. The method as claimed in claim 1, wherein the pH during polymerization is 1.0 or less.

3. The method as claimed in claim 1, wherein said oxidizing agent is used in an amount from 1 to 5 equivalents with respect to one mole of the thiophene.

4. The method as claimed in claim 1, wherein said oxidizing agent is used in an amount from 2 to 4 equivalents with respect to one mole of the thiophene.

5. The method as claimed in claim 2, wherein said oxidizing agent is used in an amount from 2 to 4 equivalents with respect to one mole of the thiophene and the oxidizing agent comprises a catalytic amount of metal ions wherein the metal ions are iron, cobalt, nickel, molybdenum or vanadium ions.

* * * * *